June 1, 1926.                                                           1,587,344
G. MORGAN
TRANSMISSION DEVICE
Filed July 14, 1923
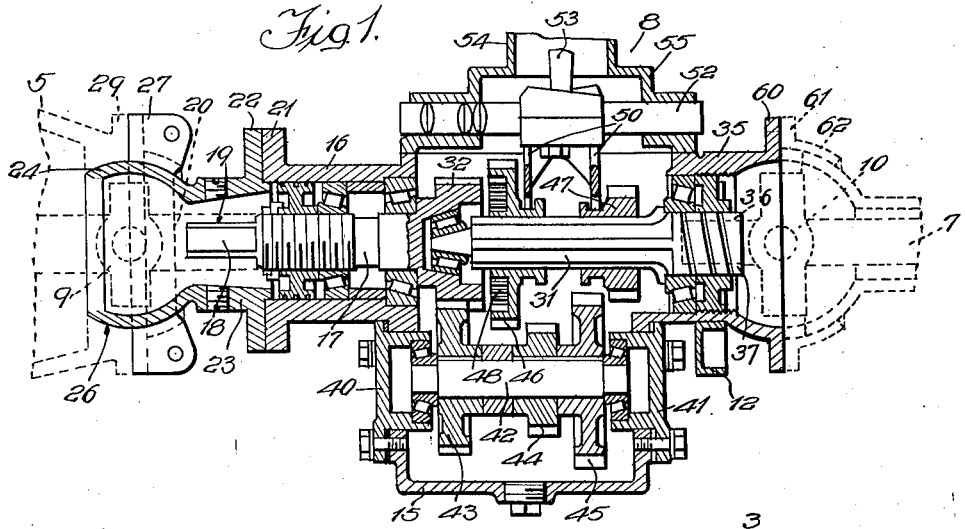
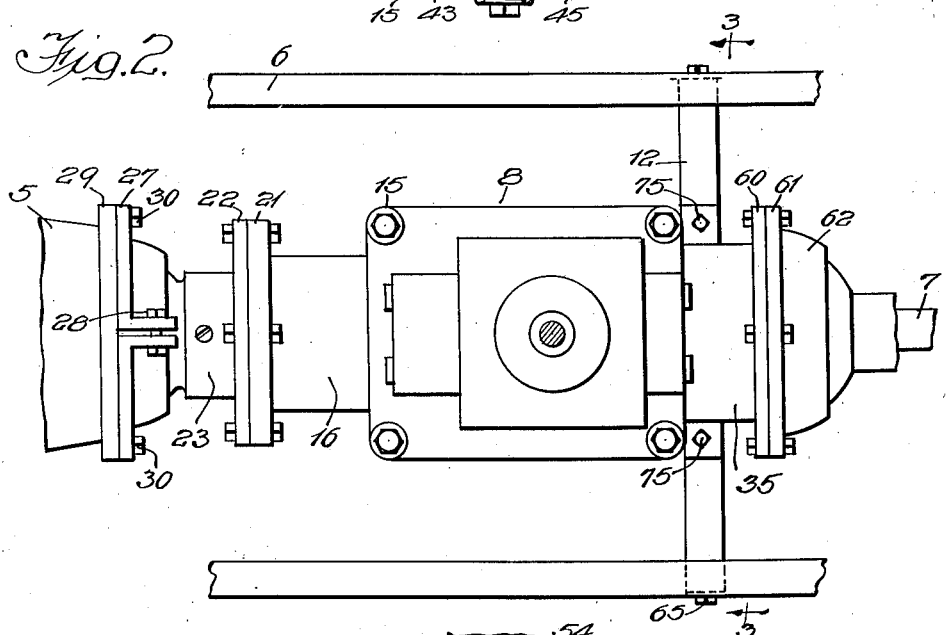
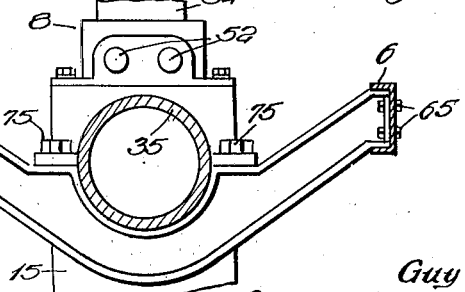
Witnesses:
W. F. Kilroy
Harry R. L. White
Inventor:
Guy Morgan Patented June 1, 1926.

1,587,344

UNITED STATES PATENT OFFICE.

GUY MORGAN, OF NEW YORK, N. Y., ASSIGNOR TO THE WARFORD CORPORATION, OF NEW YORK, N. Y., A CORPORATION OF NEW YORK.

TRANSMISSION DEVICE.

Application filed July 14, 1923. Serial No. 651,450.

My invention relates to transmission devices, and more particularly to auxiliary transmission devices for use with the ordinary transmission in a motor vehicle for the purpose of providing additional speeds.

My invention contemplates an improved mounting of the auxiliary transmission by means of which an improved two-fold result is secured, namely, the main transmission and other drive and transmission encasing parts are relieved of the driving stresses incident to the transmission of the drive from the engine to the drive axle, and the auxiliary transmission is relieved of the warping, weaving, twisting and straining of the chassis and vehicle frame.

In the drawings:—

Fig. 1 is a vertical longitudinal section through an auxiliary transmission mounted in accordance with the teachings of my present invention;

Fig. 2 is a plan view of the same; and

Fig. 3 is a transverse section on line 3—3 of Fig. 2.

Referring to the drawings, 5 designates fragmentarily the ordinary transmission in the "Ford" type of vehicle, 6—6 the longitudinally extending side members or sills of the vehicle frame, 7 the propeller shaft through which the drive is transmitted to the differential at the drive axle and then to the drive wheels, and 8 the auxiliary transmission mounted between transmission 5 and the forward end of propeller shaft 7 which in the present instance is cut off or shortened sufficiently to permit such arrangement.

At the rear or propeller shaft end of transmission 5 is the universal driving connection 9 and at the front or engine end of propeller shaft 7 is a second universal driving connection 10. Auxiliary transmission 8 forms a driving connection between universals 9 and 10 and is mounted therebetween, at one end rigidly upon side members or sills 6—6 of the main frame through a cross member 12 supported at its opposite ends by the longitudinal side or sill members 6—6 of the vehicle frame. The opposite end of auxiliary transmission 8 is yieldably or flexibly supported by the rear end of transmission 5. This yieldable or flexible supporting connection with transmission 5 is the third point of a three point suspension, the other two points being the points of support of the opposite ends of the cross member or spanner 12 upon longitudinal side or sill members 6—6.

The torque reaction of the auxiliary transmission due to the transmission of the drive therethrough is taken up by cross member 12 and transmitted to the frame or chassis of the vehicle therethrough. Transmission 5 and the other drive and transmission encasing parts are thereby relieved of the torque and other driving stresses incidental to propulsion of the vehicle. At the same time the yieldable or flexible supporting connection between the forward end of the auxiliary transmission 8 and the adjacent end of transmission 5 relieves the auxiliary transmission of weaving, warping, twisting and straining of the vehicle frame, and permits and accommodates itself to relative movement between the frame members of the chassis and the auxiliary transmission. In this manner the advantages of the rigid mounting of the auxiliary transmission are secured, namely, relieving the main transmission and other drive and transmission encasing parts of the torque and other driving stresses, and the disadvantage of subjecting the auxiliary transmission to road shocks and twisting and weaving of the vehicle frame, which will result in weakening of the frame and loosening of the auxiliary transmission mounting, is minimized.

In the particular embodiment of the invention selected for illustration, the auxiliary transmission is of the type disclosed in my co-pending applications, Serial Numbers 588,744 and 612,349, filed September 18, 1922 and January 12, 1923, respectively. The casing 15 of auxiliary transmission 8 is provided with a tubular projection 16 in which forwardly projecting stub shaft 17 is rotatably journaled, the forward end of said shaft terminating in an angular stud 18 having driving engagement with the rearwardly projecting stud 20 of universal 9 by engagement in an angular socket 19 therein. The forward end of tubular projection 16 terminates in a flange 21 bolted to a flange 22 at the rear end of a coupling member 23. The forward end of member 23 is bulged or headed and of spherical formation at 24. This headed end 24 partially encases joint 9 and is clamped for universal movement in a recess 26 in the rear end of the casing of transmission 5 by a two-piece ring 27, the parts of which are clamped together by bolts 28 and to flange 29 at the rear end of the casing of transmission 5 by bolts 30. Member 23 flexibly or yieldably supports the forward end of auxiliary transmission 8 on the rear end of transmission 5.

A second stub shaft 31 rotatably journaled at its forward end in a bearing mounted in the rear recessed face of a pinion or gear 32 formed integral with the rear end of shaft 17 is rotatably journaled at its opposite end in a bearing mounted in a rearwardly extending tubular projection 35, and this rear end is provided with an angular socket 36 for driving engagement with an angular stud 37 projecting forwardly from universal 10.

The inner ends of removable flanged plugs 40 and 41 bolted in co-axial openings in casing 15 below tubular extensions 16 and 35 are recessed to receive bearing members in which the opposite ends of a countershaft 42 are rotatably journaled. Fixed on countershaft 32 is gear 43 permanently meshing with gear or pinion 32 and gears 44 and 45 for driving engagement with gears 46 and 47 feathered on shaft 31 for longitudinal movement therealong. Gear 46 in addition to being formed for engagement with spur gear 44 is recessed and provided with an internal gear 48 which is adapted to be shifted into mesh with pinion 32 to connect shafts 17 and 31 for rotation together. Gears 46 and 47 are shifted as desired by shifting members 50 fixed on slidable shifter rods or shafts 52 which are shifted as desired by a lever 53 fulcrumed in tower 54 projecting upwardly from cover 55.

The rear end of tubular projection 35 partially encases joint 10 and terminates in a flange 60 bolted to a flange 61 of a casing 62 enclosing joint 10. Tubular projection 35 rests upon transverse supporting member 12 which member spans sills 6—6 and is secured at its opposite ends thereto by bolts 65. Tubular projection 35 is preferably bolted at 75 to the cross member 12 which forms the rigid mounting at the rear end of the auxiliary transmission for transmitting the driving stresses to the vehicle frame.

When teeth 48 are in mesh with pinion 32, shafts 17 and 31 are connected for rotation together and the power from the "Ford" transmission 5 can be imparted through the same speed ratios as heretofore. By shifting gear 46 to demesh teeth 48 from pinion 32 and mesh the external teeth of said gear with gear 44, an under drive or stepping-down of the speed at the auxiliary transmission is secured. With gears 46 and 44 in mesh, transmission 5 is operable to change the stepped-down speed. By shifting gear 46 into position between gears 43 and 44 and gear 47 into mesh with gear 45, the driving ratio is stepped-up at the auxiliary transmission and transmission 5 is again operable to change the stepped-up speed. The reverse of transmission 5 is of course operable with the auxiliary transmission in direct or in under drive or over drive position.

The three point suspension is especially advantageous where a power take-off such as disclosed in my co-pending application, Ser. No. 612,349, filed January 12, 1923, is employed. Auxiliary transmission 8 may be provided with such a take-off or the take-off may be omitted as desired. When omitted, the opening in casing 15 of the auxiliary transmission, over which the take-off is attached, is covered by a flat or any other suitable cover or closure plate.

The ball and socket or universal support at the forward end of the auxiliary transmission makes shaft 17 self-centering with respect to the main transmission shaft to which it is connected. Self-adjustment to wear in the bearings is permitted and installation of the auxiliary transmission is facilitated.

I do not, of course, intend to limit the invention to the details of the particular embodiment shown and described. The details of the auxiliary transmission may, for example, be varied, and the rigid mounting thereof may be upon a suitable auxiliary or sub-frame instead of directly upon the longitudinal side or sill members of the main frame.

I claim:—

1. In combination, a frame, a motor and transmision unit having a three point support on said frame comprising a support on the frame centrally of the forward end of said unit and supports on the frame at opposite sides of the rear end of said unit, an auxiliary transmission having universal joint support centrally of its forward end on said main transmission and a pair of supports on the frame, one on each side for the rear end of said auxiliary transmission, a rear axle having a differential therein, and a propeller shaft connecting the auxiliary transmission, and said differential and having universal joint connection at its forward end with the auxiliary transmission.

2. In combination, a frame, a main transmission mounted thereon, a cross member extending transversely across the frame and supported at its opposite ends thereon, an auxiliary transmission having universal joint support at its forward end on the main transmission and supported at its rear end on said cross member between the opposite ends thereof, and a propeller shaft extending rearwardly from the auxiliary transmission and having universal joint connection with the rear end of said auxiliary transmission.

In witness whereof, I hereunto subscribe my name this 9 day of July, 1923.

GUY MORGAN.